(12) United States Patent  
Slavov et al.

(10) Patent No.: US 8,919,540 B2
(45) Date of Patent: Dec. 30, 2014

(54) TAKE-UP DEVICE

(71) Applicant: Thyssenkrupp Robins, Inc., Greenwood Village, CO (US)

(72) Inventors: Svetoslav Slavov, Littleton, CO (US); Vladimir Svirsky, Aurora, CO (US)

(73) Assignee: Thyssenkrupp Robins, Inc., Greenwood Village, CO (US)

(*) Notice: Subject to any disclaimer, the term of this patent is extended or adjusted under 35 U.S.C. 154(b) by 0 days.

(21) Appl. No.: 13/969,441

(22) Filed: Aug. 16, 2013

(65) Prior Publication Data

US 2014/0048390 A1    Feb. 20, 2014

Related U.S. Application Data

(60) Provisional application No. 61/684,042, filed on Aug. 16, 2012.

(51) Int. Cl.
*B65G 23/44* (2006.01)

(52) U.S. Cl.
CPC ..................... *B65G 23/44* (2013.01)
USPC ........................................... 198/815

(58) Field of Classification Search
CPC .............................. B65G 23/44; B65G 21/14
USPC ........................................... 198/815
See application file for complete search history.

(56) References Cited

U.S. PATENT DOCUMENTS

| 3,054,499 | A  | * | 9/1962 | Petix et al. ..................... 198/815 |
| 4,033,451 | A  |   | 7/1977 | Kelsall |
| 6,220,425 | B1 |   | 4/2001 | Knapp |
| 6,394,261 | B1 | * | 5/2002 | DeGennaro ................... 198/815 |
| 2009/0101475 | A1 | * | 4/2009 | Nguyen et al. ................ 198/815 |

* cited by examiner

*Primary Examiner* — James R Bidwell
(74) *Attorney, Agent, or Firm* — Dorsey & Whitney LLP

(57) ABSTRACT

A conveyor take-up device may include a carriage, a pulley, a counterweight assembly, at least one connector, and at least one safety restraint. The carriage may be movably joined to a support structure and may support the pulley, which may be configured for operative association with an endless conveyor belt. The counterweight assembly may include a counterweight arm, a tension arm, and a counterweight. The counterweight arm may be pivotally joined to the support structure and configured to move between upper and lower limit positions. The tension arm may extend generally transversely from a first end portion of the counterweight arm with the counterweight supported by the counterweight arm distal from the tension arm. The connector may be joined to the carriage at one end portion of connector and to the tension arm at a second end portion that is distal the first end portion of the connector.

11 Claims, 6 Drawing Sheets

TAKE-UP DEVICE

CROSS-REFERENCE TO RELATED APPLICATIONS

This application claims the benefit, under 35 U.S.C. §119(e), to U.S. provisional application No. 61/684,042, entitled "Take-Up Device" and filed on Aug. 16, 2012, which is hereby incorporated herein by reference in its entirety.

TECHNOLOGICAL FIELD

The technological field generally relates to conveyors, and more particularly to endless belt conveyors.

BACKGROUND

Tensioning devices for endless belt conveyors are used to maintain the required tension in the endless belt as the endless belt accrues permanent stretch, particularly during the initial running period for a newly installed endless belt. For relatively short conveyors, such as those sometimes used to carry away a discharge feed from a mineral crusher, the amount of linear travel required from the tensioning device is typically on the order of several inches up to one or two feet. Conventional tensioning devices include screw take-ups, hydraulic take-ups, and tensioned rope-and-sheave system take-ups that bias a tail pulley by weights positioned within a vertical tower. Disadvantages of these various conventional take-up systems may include the need for frequent manual adjustments, significant maintenance requirements, substantial costs, or interference with clean-up or maintenance work that must often be conducted in the vicinity of the tail of the conveyor.

SUMMARY

One embodiment of a take-up device for a conveyor may include a carriage, a pulley, a counterweight assembly, a connector, and a safety restraint. The carriage may be movably joined to a support structure. The pulley may be joined to the carriage and configured for operative association with an endless belt of the conveyor. The counterweight assembly may include a counterweight arm, a tension arm, and a counterweight. The counterweight arm may be pivotally joined to the support structure and configured to move from an upper limit position to a lower limit position. The tension arm may extend generally transversely from a first end portion of the counterweight arm. The counterweight may be supported by the counterweight arm at a second end portion of the counterweight arm where the second end portion of the counterweight arm is distal from the first end portion of the counterweight arm. The connector may be joined to the carriage at one end portion of the connector and to the tension arm at a second end portion of the connector that is distal the first end portion of the connector. The safety restraint may be joined to the counterweight arm and configured to resist movement of the counterweight arm below the lower limit position.

In some embodiments of the take-up device, a ratio of a length of the counterweight arm to a length of the tension arm may range from no less than approximately 1:1 to no greater than approximately 10:1, and the ratio may be approximately 5:1.

In some embodiments of the take-up device, the upper limit position of the counterweight arm may be approximately 30 degrees above horizontal, and the lower limit position may be approximately 15 degrees below horizontal.

In some embodiments of the take-up device, a connector adjustment mechanism may be joined to the carriage, and the connector may be joined to the carriage via the connector adjustment mechanism. The connector adjustment mechanism may be a turnbuckle or the like.

In some embodiments of the take-up device, the counterweight assembly may further include a second counterweight arm and a second tension arm. The second counterweight arm may be pivotally joined to the support structure and configured to move from the upper limit position to the lower limit position. The second tension arm may extend generally transversely from a first end portion of the second counterweight arm. The counterweight may also be supported by the second counterweight arm at a second end portion of the second counterweight arm where the second end portion of the second counterweight arm is distal from the first end portion of the second counterweight arm. A second connector may be joined to the carriage at one end portion of the second connector and to the second tension arm at a second end portion of the second connector that is distal the first end portion of the second connector.

In some embodiments of the take-up device, the connector may be a tension chain or cable.

In some embodiments of the take-up device, the safety restraint comprises a chain or a cable.

In some embodiments of the take-up device, the carriage, the counterweight assembly, and the connector may be configured to substantially move the pulley in a direction that is substantially parallel to a longitudinal direction of travel of the endless belt.

DETAILED DESCRIPTION

Described herein are take-up devices for an endless belt conveyor. These take-up devices may provide a relatively low cost system for automatic tensioning of an endless belt for conveyors that require less than several inches of dynamic take-up travel in the course of start-up operation, shut down, and due to thermal elongation/contraction effects. These take-up devices may provide a highly visible indication for when the devices require a manual re-setting of the automatic tensioning range of the devices. The take-up devices may allow for relatively unobstructed access by vehicles used to clean-up spillage in the vicinity of the take-up device by occupying a limited volumetric space and/or by allowing for ample headroom and unimpeded floor space underneath a tail of the endless belt conveyor. The take-up devices may include counterweights with relatively low masses as a result of the counterweights acting through a mechanical advantage. The take-up devices may have relatively low capital costs and/or minimal maintenance requirements.

Figure 1:
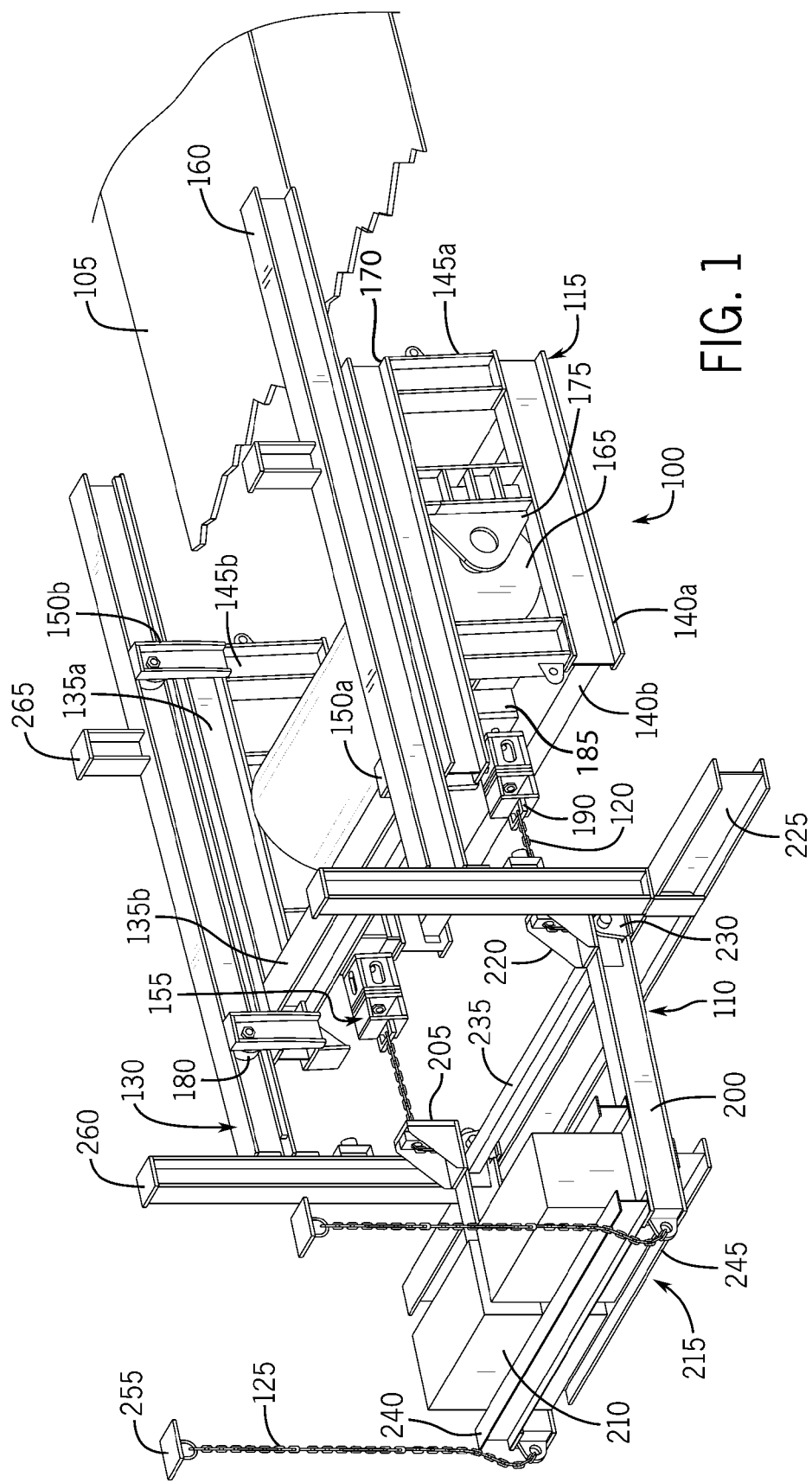
FIG. 1 shows a top isometric top view of a take-up device for a conveyor belt.
Figure 2:
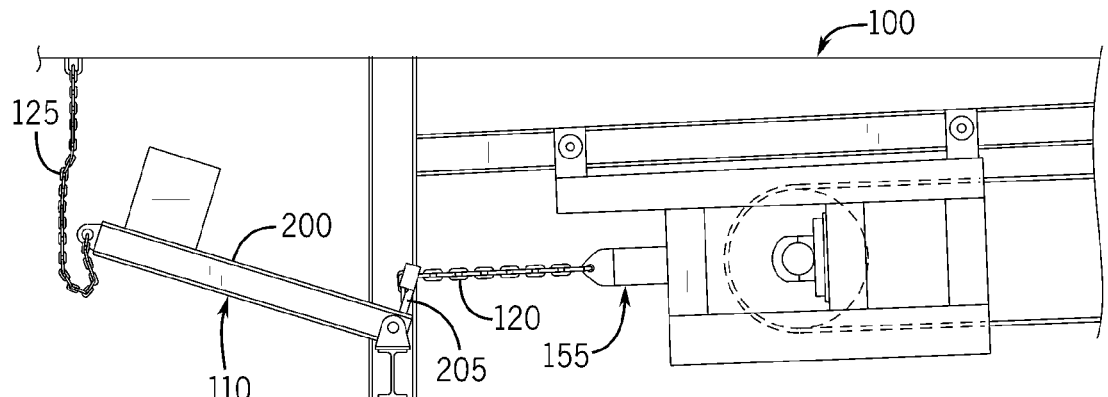
FIG. 2 shows a schematic elevation view of the take-up device shown in FIG. 1 showing a counterweight assembly in an upper limit position.
Figure 3:
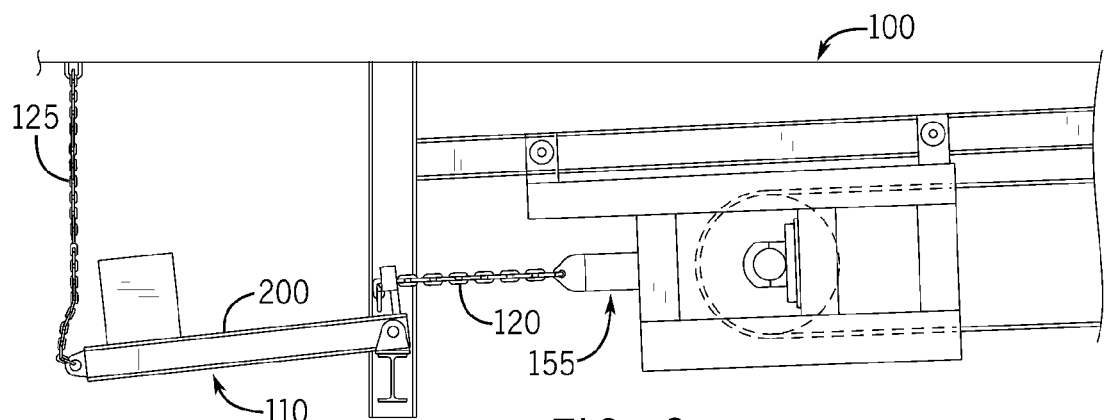
FIG. 3 shows another schematic elevation view of the take-up device shown in FIG. 1, showing a counterweight assembly in a lower limit position.
Figure 4:
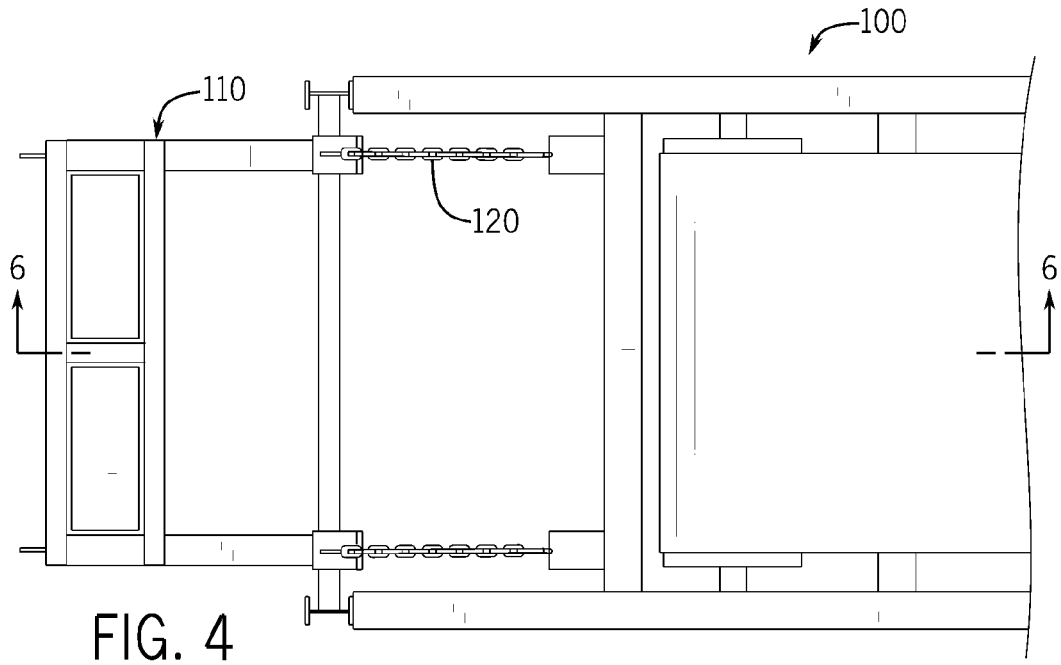
FIG. 4 shows a schematic top plan view of the take-up device shown in FIG. 1.
Figure 5:
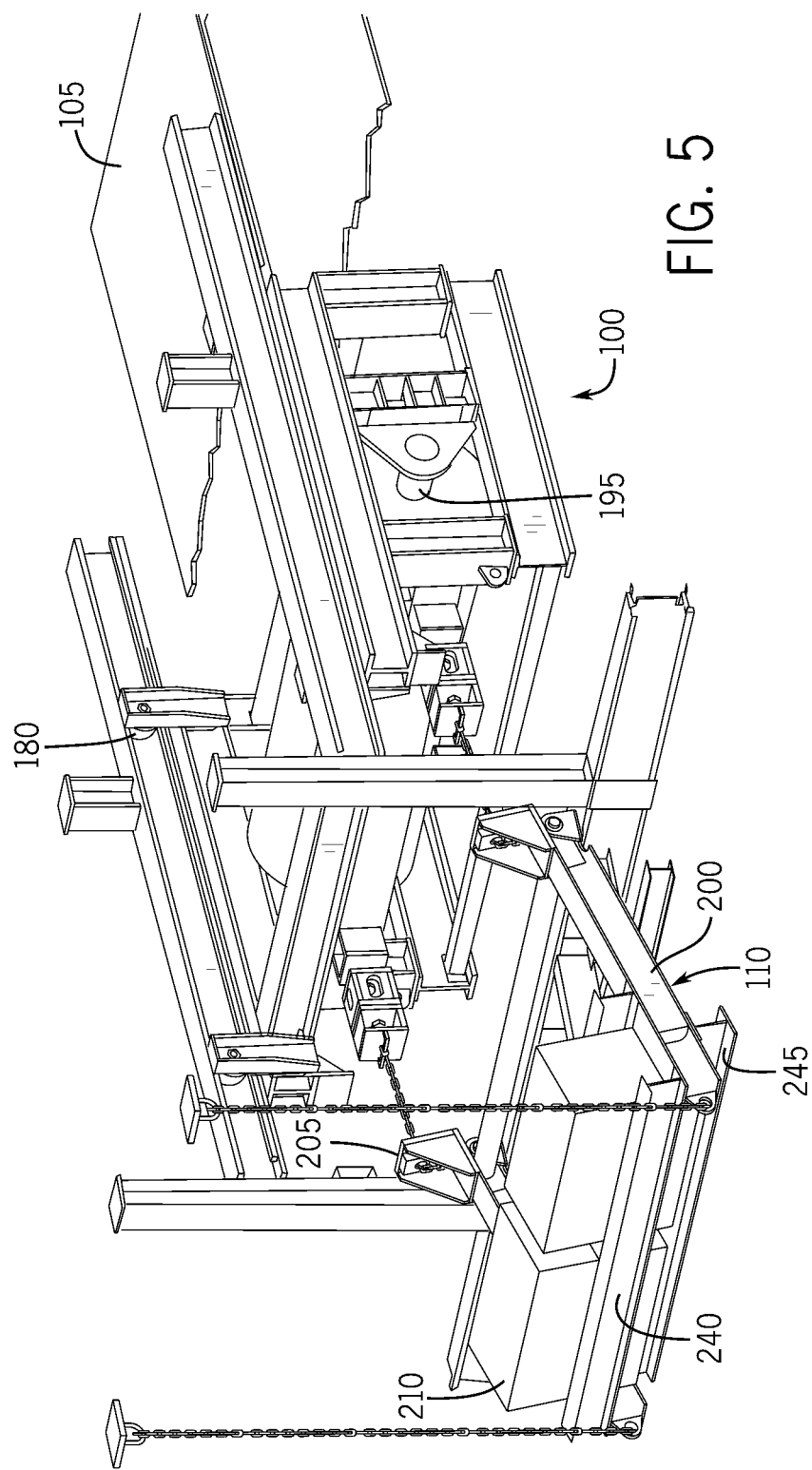
FIG. 5 shows an isometric top view of the take-up device shown in FIG. 1, showing the counterweight assembly in the lower limit position.
Figure 6:
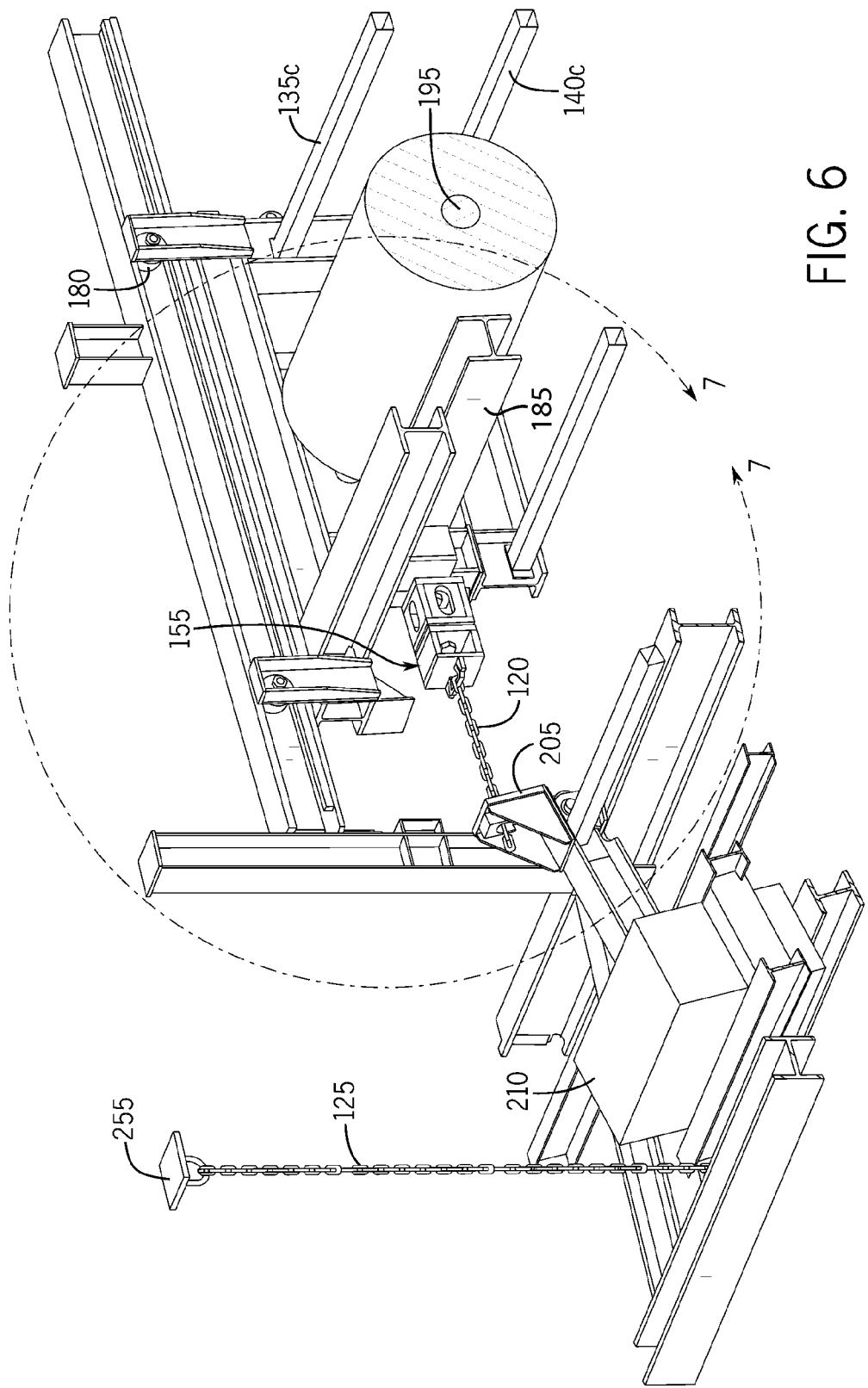
FIG. 6 shows an isometric top cross-section view of the take-up device shown in FIG. 1, viewed along line 6-6 in FIG. 1.
Figure 7:
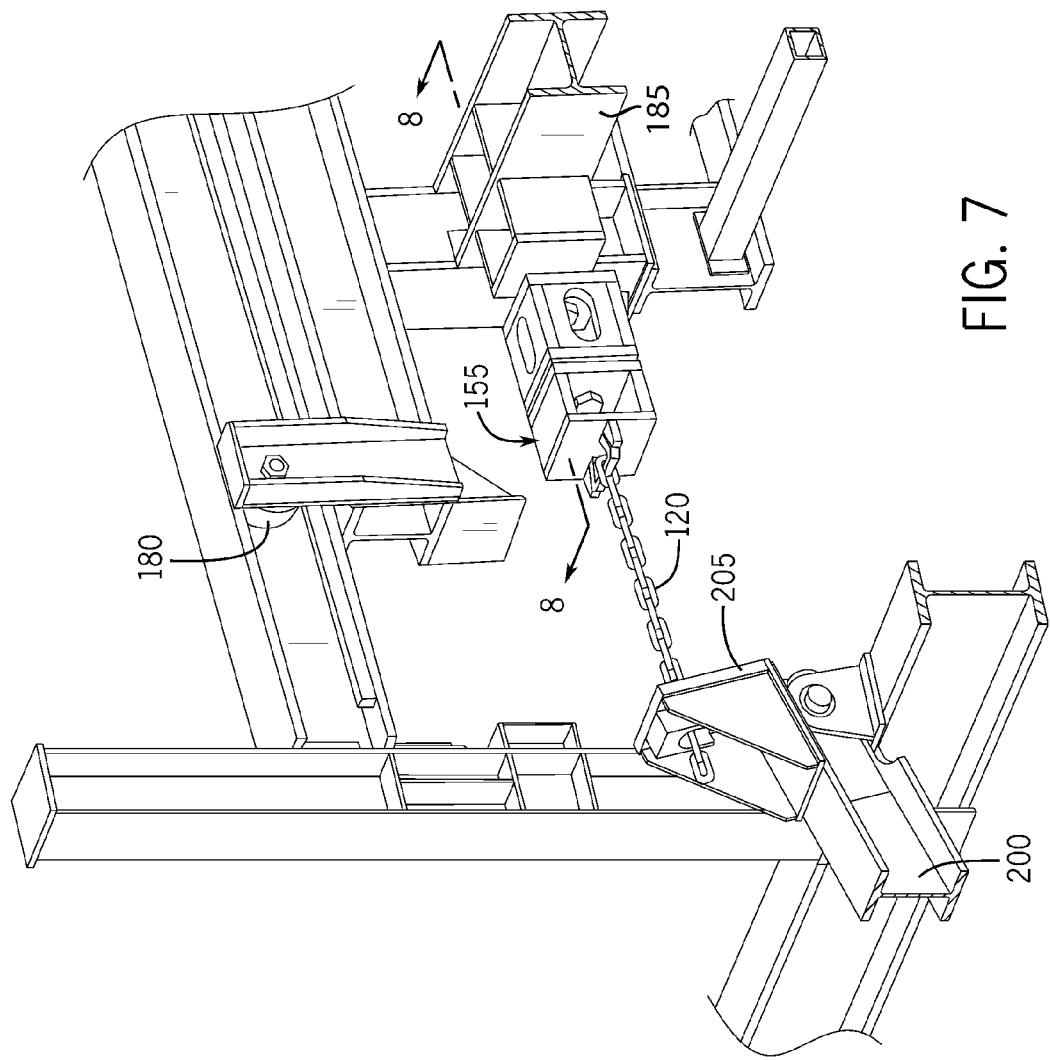
FIG. 7 shows an isometric top enlarged cross-section view of a portion of the take-up device shown in FIG. 1, viewed along line 7-7 in FIG. 6.
Figure 8:
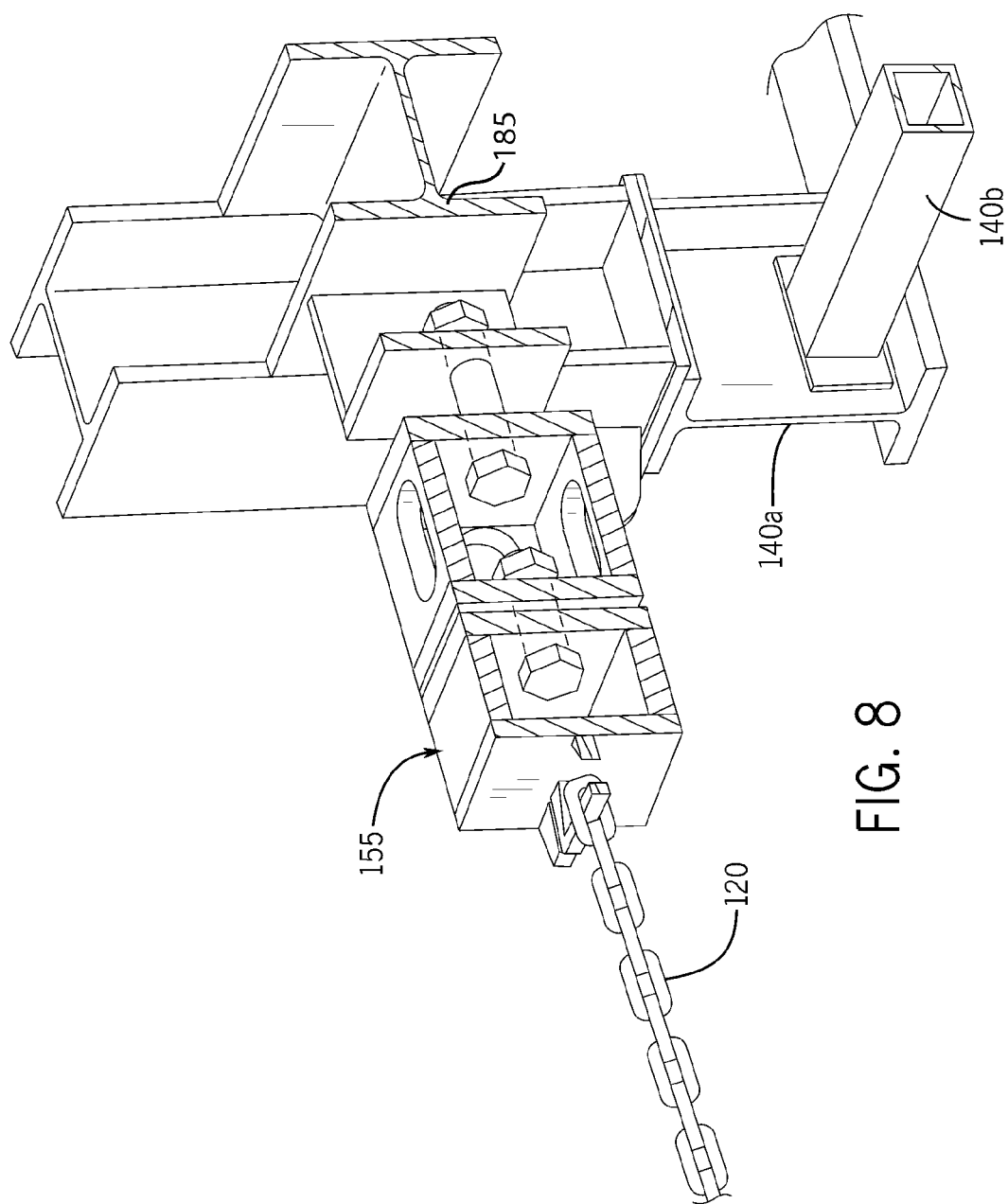
FIG. 8 shows an isometric top enlarge cross-section view of a portion of the take-up device shown in FIG. 1, viewed, for the most part, along line 8-8 in FIG. 7.

FIG. 1 shows an isometric top view of a take-up device 100 for an endless belt conveyor 105, and FIGS. 2-3 show schematic elevation views of the take-up device 100 of FIG. 1. FIG. 4 shows a top plan of the take-up device 100 of FIG. 1. FIG. 5 shows an isometric top view of the take-up device 100 of FIG. 1, showing a counterweight assembly 110 in a low limit position. FIGS. 6-8 show various isometric top cross-sectional views of the take-up device 100 of FIG. 1. With reference to FIGS. 1-8, the take-up device 100 may include a carriage 115, the counterweight assembly 110, one or more connectors 120, and one or more safety restraints 125. The carriage 115 and the counterweight assembly 110 may each be supported by a support frame 130. Further, the carriage 115 and the counterweight assembly 110 may each be movingly joined to the support frame 130, which may be supported by a frame for the conveyor (not shown). In some embodiments, the carriage 115 may slide relative to the support frame 130, and the counterweight assembly 110 may pivot or rotate relative to the support frame 130. In such embodiments, the counterweight assembly 110 may further be configured to pivot between a pre-defined upper limit, position and a pre-defined lower limit position. The one or more connectors 120 may join the carriage 115 to the counterweight assembly 110. Further, the counterweight assembly 110 may apply a force to the carriage 115, via the one or more connectors 120, that tensions the endless belt 105 of the conveyor. The one or more safety restraints 125 may be joined to the conveyor frame or other fixed support element and the counterweight assembly 110. The one or more safety restraints 125 may resist movement to the counterweight assembly 110 below the lower limit position.

The carriage 115 may include upper carriage beams 135a-c, lower carriage beams 140, carriage columns 145, carriage posts 150, one or more connector adjustment mechanisms 155, and an adjustment mechanism beam 185. The upper carriage beams 135a-c may include a pair of first upper carriage beams 135a, a second upper carriage beam 135b, and a third upper carriage beam 135c, and the lower carriage beams 140a-b may include a pair of first lower carriage beams 140a and a pair of second lower carriage beams 140b. The carriage columns 145a-b may include a first set of carriage columns 145a and a second set of carriage columns 145b. The carriage posts 150 may include a first set of carriage posts 150a and a second set of carriage posts 150b.

Each first upper carriage beam 135a may include a longitudinal axis that is substantially parallel to a longitudinal travel direction of an endless belt 105 of the conveyor. Further, each first upper carriage beam 135a may be positioned at approximately the same elevation and may be positioned to generally reside underneath an upper support beam 160 of the support frame. The longitudinal axis of each first upper carriage beam 135a may be approximately parallel to a longitudinal axis of the upper support beam 160 that is positioned above it. Yet further, the first upper carriage beams 135a may be spaced apart from each other at a distance, as measured from inner facing edges of the first upper carriage beams 135a, that is at least as great as a width of the conveyor belt 105.

The second upper carriage beam 135b may be joined to the first upper carriage beams 135a proximate the rear end portions of the first upper carriage beams 135a. The second upper carriage beam 135b may span between the first upper carriage beams 135a. A longitudinal axis of the second upper carriage beam 135b may be generally transverse to the longitudinal axes of the first upper carriage beams 135a. The second upper carriage beam 135b may help to maintain the first upper carriage beams 135a at their spaced apart distance.

The third upper carriage beam 135c may be joined to carriage columns 145a positioned at the front portion of the carriage 115. Similar to the second upper carriage beam 135b, the third upper carriage beam 135c may generally span the distance between the first upper carriage beams 135a and may have a longitudinal axis that is generally transverse to the longitudinal axes of the first upper carriage beams 135a. The third upper carriage beam 135c may also help to maintain the first upper carriage beams 135a at their spaced apart distance.

Each first lower carriage beam 140a may be positioned to reside directly underneath, at a predetermined distance, one of the first upper carriage beams 135a. Each first lower carriage beam 140a may include a longitudinal axis that is substantially parallel to a longitudinal travel direction of the endless belt 105 of the conveyor. Further, each first lower carriage beam 140a may be positioned at approximately the same elevation.

Each second lower carriage beam 140b may be joined to the first lower carriage beams 140a and may span between them. One of the second lower carriage beams 140b may be joined to front end portions of the first lower carriage beams 140a, and the other of the second lower carriage beams 140b may be joined to the rear end portions of the first lower carriage beams 140a. The second lower carriage beam 140b may assist in maintaining the spaced apart distance of the first lower carriage beams 140a.

The first set of carriage columns 145a may join one of the first upper carriage beams 135a to the lower carriage beam 140a that is positioned underneath it, and the second set of carriage columns 145b may join the other of the first upper carriage beams 135a to the lower carriage beam 140a that is positioned underneath it. Each set of carriage columns 145a-b may include three carriage columns: one carriage column that spans between its respective first upper and lower carriage beams 135a, 140a at the front end portions of the carriage beams 135a, 140a; one carriage column that spans between its respective first upper and lower carriage beams 135a, 140a at the middle portions of the carriage beams 135a, 140a; and one carriage column that spans between its respective first upper and lower carriage beams 135a, 140a at the rear end portions of the carriage beams 135a, 140a. The carriage columns may help to maintain the spacing between the first upper carriage beams 135a and the lower carriage beams 140a.

The various upper and lower carriage beams 135a-c, 140a-b and carriage columns 145a-b may collectively define a generally three-dimensional box-like carriage frame 170 for the carriage 115. The carriage frame 170 may be used to rotatably support a take-up pulley 165 and at least a portion of the endless belt 105 that is joined to the take-up pulley 165. Further, the take-up pulley 165 may be joined to the carriage frame 170 so that any sliding movement of the carriage frame 170 relative to the support frame 130 results in the take-up pulley 165 moving by the same magnitude and in the same direction as the carriage frame 170. Further, the sliding movement of the carriage frame 170 relative to the support frame 130 allows for a desired tension to be maintained in the endless belt 105.

A first pulley bearing 175 may be joined to one of the carriage columns in the first set of carriage columns 145a, and a second pulley bearing 175 may be joined to one of the carriage columns in the second of carriage columns 145b. The first and second pulley bearings 175 may rotatably support the take-up pulley 165, which in turn supports the endless belt 105. Thus, the carriage 115 may rotatably support the take-up pulley 165 for the conveyor.

The first set of carriage posts 150a may join one of the first upper carriage beams 135a to the upper support beam 160 that is positioned above it, and the second set of carriage posts 150b may join the other of the first upper carriage beams 135a to the upper support beam 160 that is positioned above it. Each set of carriage posts 150a-b may include two carriage posts: one carriage post that spans between its respective first upper carriage beam 135a and upper support beam 160 at the front end portion of the first upper carriage beam 135a; and one carriage post that spans between its respective first upper carriage beam 135a and upper support beam 160 at the rear end portion of the first upper carriage beam 135a. Each carriage post 150a-b may further include a wheel, a roller, or the like 180 joined to the carriage post by an axle or the like. Each wheel, the roller, or the like 180 may be received within a track attached to a respective upper support beam 160. The wheels, the rollers, or the like 180 allow the carriage 115 to slide or otherwise move relative to the upper support beams 160 in a direction that is substantially parallel to a longitudinal direction of travel of the endless conveyor belt 105.

A pair of connector adjustment mechanisms 155 may be joined to the adjustment mechanism beam 185. Each connector adjustment mechanism 155 may be spaced apart from the other connector adjustment mechanism 155 by a predetermined distance. Further, in some embodiments, each connector adjustment mechanism 155 may be positioned proximate an end portion of the adjustment mechanism beam 185. Each connector adjustment mechanism 155 may take to the form of a turnbuckle or other structure that allows for an alignment or adjustment of the respective connector 120 joined to the connector adjustment mechanism 155. In some embodiments, each connector adjustment mechanism 155 may be used as a way to finely adjust the length of the connectors 120 in order to align the take-up pulley 165 to provide for correct tracking of the endless belt 105. U-shaped connection elements 190 or the like may be joined to the adjustment mechanism beam 185 to facilitate joining the turnbuckles or the like to the connector adjustment mechanism beam 185.

The adjustment mechanism beam 185 may be joined to the carriage columns 145a-b that are positioned at the rear end portions of the lower carriage beams 140a and may span between the columns 145a-b. Further, the adjustment mechanism beam 185 may be located at an elevation that is approximately the same as the elevation of an axle 195 that supports the take-up pulley 165.

The counterweight assembly 110 may include two counterweight arms 200, two tension arms 205, one or more counterweights 210, and a counterweight support system 215. If desired, more or less than two counterweight arms 200 and two tension arms 205 may be utilized. Each tension arm 205 may be joined to an end portion of a counterweight arm 200 and may extend generally transversely away from a longitudinal axis of the counterweight arm 200. Gusset plates or other stiffeners 220 may be joined to each tension arm 205 and its respective counterweight arm 200.

Each counterweight arm 200 may be pivotally joined to a lower support beam 225 of the support frame 130 via one or more pivot plates 230 or the like. Each counterweight arm 200 may be joined to its respective pivot plate 230 via a pivot axle or the like that extends through aligned holes formed in the counterweight arm 200 and its respective pivot plates 230. Further, each counterweight arm 200 may be joined to its respective pivot plates 230 proximate to the end portion of the counterweight arm 200 from which the tension arm 205 ends. The counterweight arms 200 may be spaced apart from each other at approximately the same distance as the connector adjustment mechanisms 155 are spaced apart from each other. To help maintain this spacing, a counterweight arm beam 235 may be joined at each end to one of the counterweight arms 200 proximate the end portions of the counterweight arms 200 that are proximate their respective pivot plates 230. The counterweight arm beam 235 may generally span between the counterweight arms 200 and may generally have a longitudinal axis that is generally transverse to the longitudinal axes of the counterweight arms 200.

The counterweight support system 215 may be joined to the counterweight arms 200 at end portions of the counterweight arms 200 that are distal from the end portions of the counterweight arms 200 that are joined the pivot plates 230. The counterweight support system 215 may include one or more upper counterweight beams 240 and one or more lower counterweight beams 245 that are joined to upper portions and lower portions, respectively, of the counterweight arms 200. The upper and lower counterweight beams 240, 245 may generally span between the counterweight arms 200 and may be configured to define counterweight spaces, with each counterweight space sized to receive at least portions of one of the counterweights 210 therein. Further, the upper and lower counterweight beams 240, 245 may be configured to maintain the counterweights 210 received within the counterweight spaces as the counterweight arms 200 pivot from an upper limit position shown in FIG. 2 to a lower limit position shown in FIG. 3.

To facilitate pivotal movement of the counterweight arms 200 to a position below horizontal, such as the lower position shown in FIG. 3, lower portions of the counterweight arms 200 and upper portions of the lower support beam 225 may be removed proximate the pivot plates 230. In some embodiments, the desired pivot range for the counterweight arms 200 may range from approximately 30 degrees above horizontal to approximately 15 degrees below horizontal, although other ranges are contemplated. Keeping the range of rotation from approximately 30 degrees above horizontal to approximately 15 degrees below horizontal may facilitate keeping the lengths of the connectors 120 approximately aligned parallel to the longitudinal direction of travel of the endless belt 105. Further, such a range may keep the tension applied to the carriage 115 via the connectors 120 substantially constant. In particular, the tension may vary less than 4% from a median value. In some embodiments, the distance that the counterweight arms 20 are allowed to rotate below horizontal may be set to minimize the amount of interference with a maintenance area located below the counterweight assembly 110.

Two connectors 120 may be used to join the carriage 115 to the counterweight assembly 110. Each connector 120 may be joined at one end to one of the connector adjustment mechanisms 156 and at a distal end to one of the tension arms 205. Further, each connector 120 may be joined to its respective tension arm 205 at an end portion of the tension arm 205 that is distal from the counterweight arm 200. In such embodiments, the length or the tension arms 205 and the length of the counterweight arms 200 may be used to control the mechanical advantage of the counterweights 210 relative to the tension in the conveyor belt 105. In some embodiments, the lengths of the tension arms 205 and the counterweight arms 200 are selected to give the counterweights 210 a mechanical advantage of 5:1. In other embodiments, the lengths of the tension arms 205 and the counterweight arms 200 may be selected to give the counterweights 210 a mechanical advantage from as low as approximately 1:1 to as high as approximately 10:1.

Each connector 120 may take the form of a tension chain, a tension cable or the like. In some embodiments, the connector 120 may be adjustable in length so that the distance between the connector adjustment mechanism 155 and a respective tension arm 205 may be selectively increased or decreased. In some embodiments, the length of the tension chain to the length of the tension arm 205, where the length of the tension arm 206 is measured from the pivot point 230 of the counterweight arm 200 to the point that the tension chain is attached to the tension arm, may be approximately 3:1. Such a ratio may help to keep the length of the connector 120 substantially parallel to the direction of longitudinal travel of the endless belt 105. Additionally, the length of each connector 120 may be generally parallel to the longitudinal axis of the counterweight arm 200 to which it is joined via the tension arm 205 that is joined to the counterweight arm 200. Yet further, the length of each connector 120 may be generally parallel to a longitudinal axis of the connector adjustment mechanism 155.

Each safety restraint 125 may take the form of a safety chains, cables, or the like. One end of each safety chain or cable may be joined to the end portion of a counterweight arm 200 that is proximate the counterweights 210 and a distal end may be joined to a safety restraint connection element 255 that may be joined to the conveyor frame or other support. A length of each safety chain or cable may be selected to resist pivotal movement of the counterweight arm 200 to which it is attached beyond a desired angle below horizontal. For example, the length of each safety chain or cable may be selected to keep the counterweight arm to which it is attached from pivoting beyond 15 degrees below horizontal. Further, when the counterweight arm 200 to which the safety chain or cable is attached reaches its lower limit position, e.g., when it reaches 15 degrees below horizontal the safety chain or cable may have little to no slack along its length, thus providing a visual indication that the counterweight arm 200 is positioned at its lower limit position.

The support frame 130 may include the two or more upper support beams 160, the lower support beam 225, two or more support columns 260, and two or more support posts 265. The two or more upper support beams 160 may be joined to the two or more support columns 260 and the two or more support posts 265. Similarly, the lower support beam 225 may be joined to the two or more support columns 260. The support columns 260 and the support posts 265 may be joined to the conveyor frame (not shown), which may be used to support the support frame 130 and the various components of the take-up device 100 (e.g., the carriage, the counterweight assembly, the counterweights) that are supported by the support frame 130.

The beams, columns, arms, and other structural members for the carriage 115, the counterweight assembly 110, the connectors 120, the support frame 130, and the safety restraints 125 may be formed from a metal, such as steel, or any other suitable material. Further, these members may be any suitable shape, including, but not limited to, W-shapes, H-shapes, angles, boxes, tubes, or cylinders, or may take the form of chains, cables, rods, and so on. Further, the members may be joined by any suitable connection method, including by welds, bolts, or rivets. Yet further, elements such as plates, gussets, or stiffeners may be joined to the structural members to strengthen the members and/or to facilitate joining the members together.

In operation, the take-up pulley 165 may be mounted onto the carriage 115, which may be configured to slide or otherwise move relative to the support frame 130 in a direction that moves the take-up pulley 165 in a direction that is substantially parallel to the longitudinal direction of travel of the endless belt 105. One or more tension arms 205 apply tension to the endless belt 105 via one or more connectors 120 joined to the carriage 115. In particular, each tension arm 205 applies a force on the carriage 115 that pulls the carriage 115 in a direction towards the counterweights 210. As the carriage 115 is moved in this direction, a tail end of the endless belt 105, which is joined to the carriage 115 via the take-up pulley 165, is also moved in this direction. The opposite, or head end, of the endless belt 105 resists this movement, thus resulting in tension being applied to the endless belt 105 as it is stretched between its head and tail ends.

The force applied by each tension arm 205 to the carriage 115 is created by a moment applied to each tension arm 205 by the counterweights 210 being pulled in a downward direction by gravity. This moment causes the counterweight arms 200 and the tension arms 205 to rotate about a pivot axis defined by the pivot axles that join the counterweight arms 200 to their respective pivot plates 230. The direction of rotation arising from the moment created by the counterweights 210 effectively causes the tension arms 205 to try to move away from the carnage 115. This, in turn, results in the tension arms 205 applying a force to the carriage 115 via their respective connectors 120. As described above, each tension arm 205 may be shorter than its respective counterweight arm 200 in order to provide the counterweights 210 with a mechanical advantage. Further, the amount of tension provided by each tension arm 205 may be readily adjusted by increasing or decreasing the mass of the counterweights 210.

The counterweight arms 200 may be configured to operate within a desired rotational range, such as from an upper limit position of approximately 30 degrees above horizontal to a lower limit position of 15 degrees below horizontal. When the counterweight arms 200 need to be reset as a result of reaching the lower limit position, the length of each connector 120 joined to its respective counterweight arm 200 may be adjusted to allow each counterweight arm 200 to be moved from its lower limit position to its upper limit position without impacting the current relative location of the carriage 115 to the support frame 130. Limit switches may be operatively associated with the counterweight arms 200 to notify an operator when the counterweight arms 200 require resetting. For example, a first limit switch may activate a warning signal in a control room for the conveyor, and a second limit switch may cut power to the conveyor to avoid conveyor operational problems due to low take-up tension.

The safety restraints 125 may keep the counterweight arms 200 from swinging below their lower position limit. Further, the absence of slack in the safety restraints 125 may provide a visual indication to the conveyor operators that the take-up device 100 requires shortening of the connectors 120 in order to accommodate any elongation that has developed in the endless conveyor belt 105.

To shorten the connectors 120, the conveyor operators may temporarily connect the carriage 115 to a substantially stationary structure, such as the support frame 130, via cables, chains or other connection elements in such a manner so as to prevent movement of the carriage 115 away from the counterweights 210. A hoist or other suitable device may then be used to move each counterweight arm 200 from its lower position to its upper position. Each connector 120 may then be released and re-attached with its respective tension arm 205. During this release and re-attachment step, the length of each connector 120 may be shortened, thus shortening the distance between the carriage 115 and the tension arm 205. Each connector 120 may be re-attached to its respective tension arm 205 with a suitable fastening mechanism, such as hooks, chain slots, bolts and plates, open links, and so on. Additionally, each connector adjustment mechanism 155 may be used to finely adjust the length of the connectors 120 in order to align the take-up pulley 165 to provide for correct tracking of the endless belt 105.

When initially pre-tensioning the endless belt 105 to a desired static tension, a single stroke of the counterweight arms 200 (i.e., movement of the counterweight arms 200 from the upper limit position to the lower limit position) may not provide enough travel to pre-tension the endless belts 105 to the desired static tension. If this occurs, the desired pre-tension may be achieved by holding the carriage 115 in the position achieved by the maximum stroke of the counterweight arms 200, re-setting the tension arm 205 and connectors 120 in a manner as described above, and repeating the movement and re-setting of the counterweight arms 200 as many times as needed to obtain the desired pre-tension.

In some embodiments, one or more dampers, such as a linear or torsional dampers, may be joined to at least one of the counterweight arms 200. The dampers may be used to dampen any tendency of the counterweight arms 200 to bounce against the elasticity of the endless belt 105.

The fake-up devices 100 described herein may be used on short or long conveyors. For longer conveyors, the take-up devices 100 may generally work better on longer conveyors where the amount of dynamic take-up travel during operation is minimal for the sweep of the tension arms.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the scope of the invention as defined in the appended claims.

What is claimed is:

1. A take-up device for a conveyor, comprising:
    a carriage movably joined to a support structure;
    a pulley joined to the carriage, the pulley configured for operative association with an endless belt of the conveyor;
    a counterweight assembly comprising:
        a counterweight arm pivotally joined to the support structure and configured to move from an upper limit position to a lower limit position;
        a tension arm that extends generally transversely from a first end portion of the counterweight arm; and
        a counterweight supported by the counterweight arm at a second end portion of the counterweight arm where the second end portion of the counterweight arm is distal from the first end portion of the counterweight arm;
    a connector joined to the carriage at one end portion of the connector and to the tension arm at a second end portion of the connector that is distal the first end portion of the connector; and
    a safety restraint joined to the counterweight arm and configured to resist movement of the counterweight arm below the lower limit position.

2. The take-up device of claim 1, wherein a ratio of a length of the counterweight arm to a length of the tension arm ranges from no less than approximately 1:1 to no greater than approximately 10:1.

3. The take-up device of claim 2, wherein the ratio is approximately 5:1.

4. The take-up device of claim 1, wherein the upper limit position is approximately 30 degrees above horizontal and the lower limit position is approximately 15 degrees below horizontal.

5. The take-up device of claim 1, further comprising a connector adjustment mechanism joined to the carriage, and the connector is joined to the carriage via the connector adjustment mechanism.

6. The take-up device of claim 5, wherein the connector adjustment mechanism comprises a turnbuckle.

7. The take-up device of claim 1, wherein the counterweight assembly further comprises:
    a second counterweight arm pivotally joined to the support structure and configured to move from the upper limit position to the lower limit position;
    a second tension arm that extends generally transversely from a first end portion of the second counterweight arm; and
    the counterweight is also supported by the second counterweight arm at a second end portion of the second counterweight arm where the second end portion of the second counterweight arm is distal from the first end portion of the second counterweight arm.

8. The take-up device of claim 7, further comprising a second connector joined to the carriage at one end portion of the second connector and to the second tension arm at a second end portion of the second connector that is distal the first end portion of the second connector.

9. The take-up device of claim 1, wherein the connector comprises a tension chain or cable.

10. The take-up device of claim 1, wherein the safety restraint comprises a chain or a cable.

11. The take-up device of claim 1 wherein the carriage, the counterweight assembly, and the connector are configured to substantially move the pulley in a direction that is substantially parallel to a longitudinal direction of travel of the endless belt.

* * * * *